United States Patent
Bar-On et al.

[11] Patent Number: 5,870,615
[45] Date of Patent: Feb. 9, 1999

[54] AUTOMATIC CELLULAR PHONE BATTERY CHARGING BY MOBILE PERSONAL COMPUTER USING CONFIGURATION WRITE DATA AND STORAGE ELEMENT FOR CHARGING IN ACCORDANCE TO BATTERY CHARGING PARAMETER

[75] Inventors: David Bar-On, Givat Ela; Dan Gavish, Haifa, both of Israel

[73] Assignee: Intel Corporation, Santa Clara, Calif.

[21] Appl. No.: 370,185

[22] Filed: Jan. 9, 1995

[51] Int. Cl.$^6$ .................................................... G06F 13/00
[52] U.S. Cl. .................... 395/750.02; 395/821; 395/830; 395/834; 395/882; 361/683; 361/686; 320/106; 320/128; 320/137; 320/10; 320/11; 320/49
[58] Field of Search ................................... 320/21, 10, 11, 320/49, 106, 128, 137; 361/683, 686; 363/49; 379/59, 102, 446; 395/750, 821, 830, 834, 882, 750.02

[56] References Cited

U.S. PATENT DOCUMENTS

| | | |
|---|---|---|
| 4,723,269 | 2/1988 | Summerlin ............................. 379/102 |
| 4,866,602 | 9/1989 | Hall ......................................... 395/821 |
| 5,278,487 | 1/1994 | Koenck ..................................... 320/21 |
| 5,313,642 | 5/1994 | Seigel ..................................... 395/750 |
| 5,333,177 | 7/1994 | Braitberg et al. ......................... 379/59 |
| 5,375,051 | 12/1994 | Decker et al. ............................ 363/49 |
| 5,442,512 | 8/1995 | Bradbury ................................. 361/683 |
| 5,535,274 | 7/1996 | Braitberg et al. ........................ 379/446 |

Primary Examiner—Thomas C. Lee
Assistant Examiner—Po C. Huang
Attorney, Agent, or Firm—Blakely, Sokoloff, Taylor & Zafman LLP

[57] ABSTRACT

A PCMCIA card having cellular phone battery charging circuitry, and an adapter cable having a PCMCIA card connector equipped with a battery characteristic encoder, are provided to charge a cellular phone battery, using power supplied by a mobile PC, in accordance to battery characteristic information provided by the battery characteristic encoder. Starting and stopping of charging operation is preferably controlled by mobile PC. Furthermore, starting and stopping of charging operation is preferably automated with charging software application executing on mobile PC.

18 Claims, 7 Drawing Sheets

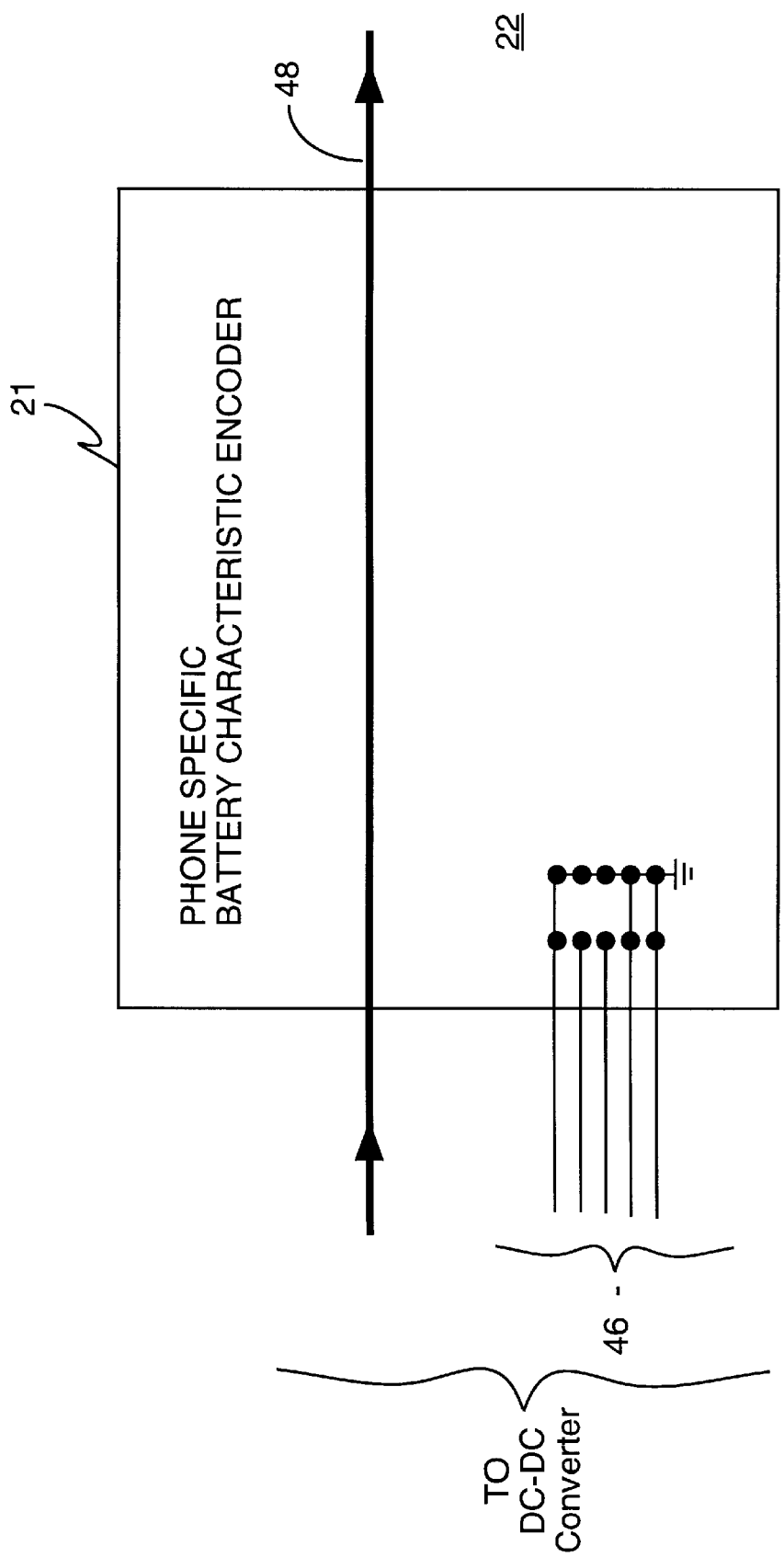

AUTOMATIC CELLULAR PHONE BATTERY CHARGING BY MOBILE PERSONAL COMPUTER USING CONFIGURATION WRITE DATA AND STORAGE ELEMENT FOR CHARGING IN ACCORDANCE TO BATTERY CHARGING PARAMETER

BACKGROUND OF THE INVENTION

1. Field of the Invention

The present invention relates to the field of cellular phone battery. More specifically, the present invention relates to the charging of cellular phone battery by mobile personal computer (PC).

2. Background Information

Today, cellular phone and mobile PC have become indispensable business equipment to many business and technical professionals, particularly those who travel frequently. Typically, users who travel with both of these equipment would carry two separate incompatible battery chargers, one for charging the cellular phone battery, and the other for charging the mobile PC battery. This prior art approach to charging the various batteries is cumbersome and less than desirable. It would be a lot more desirable if one of the battery chargers can be eliminated. As will be disclosed in more details below, the present invention provides for a method and apparatus for charging the cellular phone battery by the mobile PC that achieves the desired and other results.

SUMMARY OF THE INVENTION

The desired results are advantageously achieved by providing an otherwise conventional PCMCIA card with additional cellular phone battery charging circuitry, and an otherwise conventional adapter cable with a PCMCIA card connector at one end, having a battery characteristic encoder. The adapter cable in conjunction with the PCMCIA card couples the cellular phone battery to a mobile PC. The cellular phone battery charging circuitry, using power supplied by the mobile PC, charges the cellular phone battery, in accordance to battery characteristic information provided by the battery characteristic encoder. Preferably, starting and stopping operation of cellular phone battery charging circuitry is controlled by mobile PC.

In one embodiment, the cellular phone battery charging circuitry comprises a two stage DC—DC converter and an addressable flip-flop. The first stage is used to ramp up the voltage and the second stage serves as a limited current adjustable power supply. The battery characteristic encoder comprises a number of control lines strapped in a cellular phone battery specific manner, denoting the cellular phone battery's required charging voltage, current and slope profile. Mobile PC is provided with a cellular phone battery charging software application including a monitor routine for automatically controlling operation of cellular phone battery charging circuitry and an end user interface for customizing the control of cellular phone battery charging circuitry.

In an alternate embodiment, battery characteristic encoder comprises a number of resistors for providing charging voltage, current, and slope feedback to the mobile PC.

BRIEF DESCRIPTION OF DRAWINGS

The present invention will be described by way of exemplary embodiments, but not limitations, illustrated in the accompanying drawings in which like references denote similar elements, and in which:

FIGS. 3a–3b illustrate two embodiments of the PCMCIA connector end of the connecting cable of FIG. 1 in further detail;

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
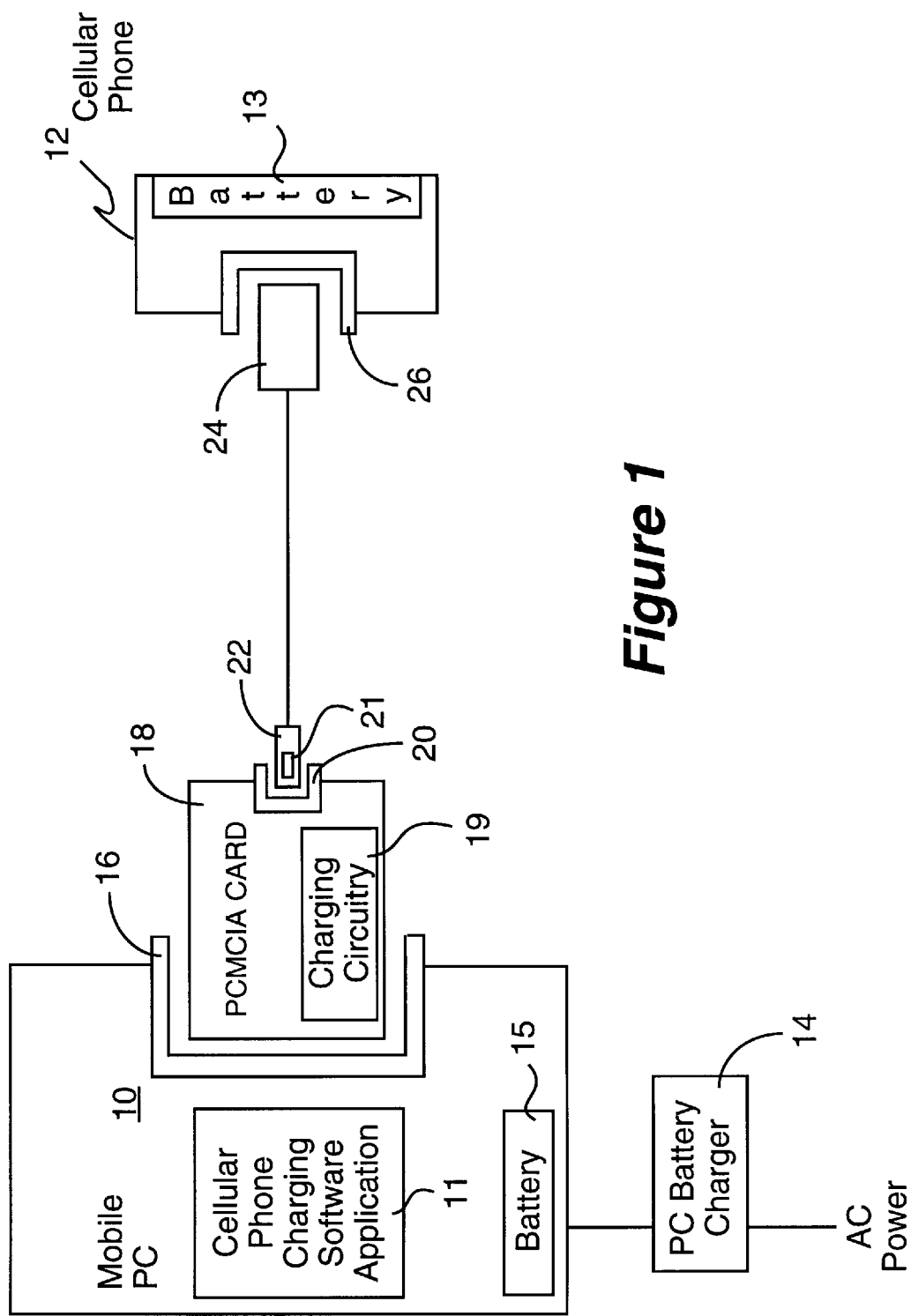
FIG. 1 illustrates charging of a cellular telephone battery by a mobile PC in accordance to the teachings of the present invention.

FIG. 1 illustrates charging of cellular phone battery 13 by a mobile PC 10 in accordance to the present invention. More specifically, battery 13 of cellular phone 12 is charged by charging circuitry 19 of the present invention, provided to PCMCIA card 18, using DC power of mobile PC 10, and in accordance to charging parameter information provided by battery characteristic encoder 21 of the present invention, provided to PCMCIA connector 22 of adapter cackle 23. Charging parameter information includes required charging voltage, charging current and charging slope of battery 13.

Cellular phone 12 includes battery 13 and adapter socket 26. Battery 13 of cellular phone 12 is designed to supply cellular phone 12 with DC power, enabling cellular phone 12 to operate in standalone mode for an extended period of time without being connected to an AC power source. Battery 13 by way of examples may be NI-CAD or NI-MH type of batteries. Operation includes making and receiving calls as well as stand by to receive calls. As the DC power of battery 13 are drained or consumed by cellular phone 12, battery 13 must be recharged. Unlike the prior art approach of removing battery 13 from cellular phone 12 and recharging it using an "off-line" battery charger, under the present invention, battery 13 is recharged with battery 13 remain installed in cellular phone 12.

Adapter socket 26 is used for delivering the charging power to battery 13. Preferably, adapter socket 26 is simply a conventional adapter socket for receiving DC power from a DC power source, such as a car cigarette lighter, found in most cellular phones. Thus, except for the manner battery 13 is charged under the present invention, cellular phone 12 including its battery 13 and adapter socket 26 is intended to represent a broad category of cellular phones known in the art. Their constitutions and functions are well known and will not be otherwise further described.

Cellular phone 12 including battery 13 and adapter socket 26 is coupled to PCMCIA card 18, by way of adapter cable 23. Adapter cable 23 includes a cellular phone connector 24 at one end, and a PCMCIA connector 22 at the other end. Cellular phone connector 24 mates with adapter socket 26, whereas PCMCIA connector 22 mates with receiver socket 20 of PCMCIA card 18. For the illustrated embodiment, cellular phone connector 24 is simply a conventional cellular phone connector found in many prior art adapter cables, whereas PCMCIA connector 22 is provided with battery characteristic encoder 21 of the present invention. However, based on the description to follow, it will be apparent to those skilled in the art that charging characteristic encoder 21 may also be disposed in cellular phone connector 24 instead. As will be described in more detail below, battery characteristic encoder 21 is cellular phone battery type specific. In other words, adapter cable 23 is cellular phone battery type specific. Except for charging characteristic encoder 21, adapter cable 23 is intended to represent a broad category of like elements known in the art, whose constitutions and functions are well known, and will not be otherwise further described. Battery characteristic encoder 21 will be described in more detail below with additional references to FIGS. 3a–3b.

PCMCIA card 18 comprises the earlier described receiver socket 20 and cellular phone battery charging circuitry 19 of the present invention. Except for cellular phone battery charging circuitry 19, PCMCIA card 18 is intended to represent a broad category of such cards known in the art, including but not limited to fax/modem cards. In view of the close functional relationship between fax/modem PCMCIA cards and cellular phones, fax/modem PCMCIA cards are actually ideal candidates for incorporating the cellular phone battery charging circuitry 19 of the present invention. The constitutions and functions of the various PCMCIA cards available in the market are well known, and will not be otherwise further described. Cellular phone battery charging circuitry 19 will be described in more detail below with additional references to FIG. 2.

PCMCIA card 18 is coupled to mobile PC 10 by way of receiver socket 16. Mobile PC 10 in turn may be connected to an AC power source via PC battery charger 14. However, it will be apparent to those skilled in the art from the description to follow that the present invention may be practiced with or without mobile PC 10 being connected to an AC power source. Furthermore, the present invention may be practiced with non-mobile computers provided they are equipped to receive PCMCIA card 18 or use a similar card designed for a PC local bus (e.g. EISA, ISA or PCI). By way of example, non-mobile computers may be a properly equipped desktop PC at the traveling user's home or destination location.

In addition to receiver socket 16, mobile PC 10 further comprises battery 15 and preferably means for controlling starting and stopping operation of cellular phone battery charging circuitry 19 of PCMCIA card 18. Preferably, receiver socket 16 is simply a standard conforming PCMCIA card receiver socket. In one embodiment, means for controlling starting and stopping operation of cellular phone battery charging circuitry 19 includes cellular phone battery charging software application 11. Except for cellular phone battery charging software application 11, mobile PC 10 is intended to represent a broad category of mobile PCs known in the art, whose constitutions and functions are well known, and will not be otherwise further described. An exemplary cellular phone battery charging software application 11 will be described in more detail below with additional references to FIGS. 4–6.

Having given an overview description of the present invention, cellular phone battery charging circuitry 19, battery characteristic encoder 21 and an exemplary cellular phone battery charging software application 11 will now be further described in order with additional references to the remaining figures. However, before describing these elements of the present invention in detail, it should be noted that in view of the novel placements of the various hardware/software elements, the present invention may be advantageously practiced without requiring any modifications to cellular phones 12 and mobile PC 10 (except loading of software application 11).

Figure 2:
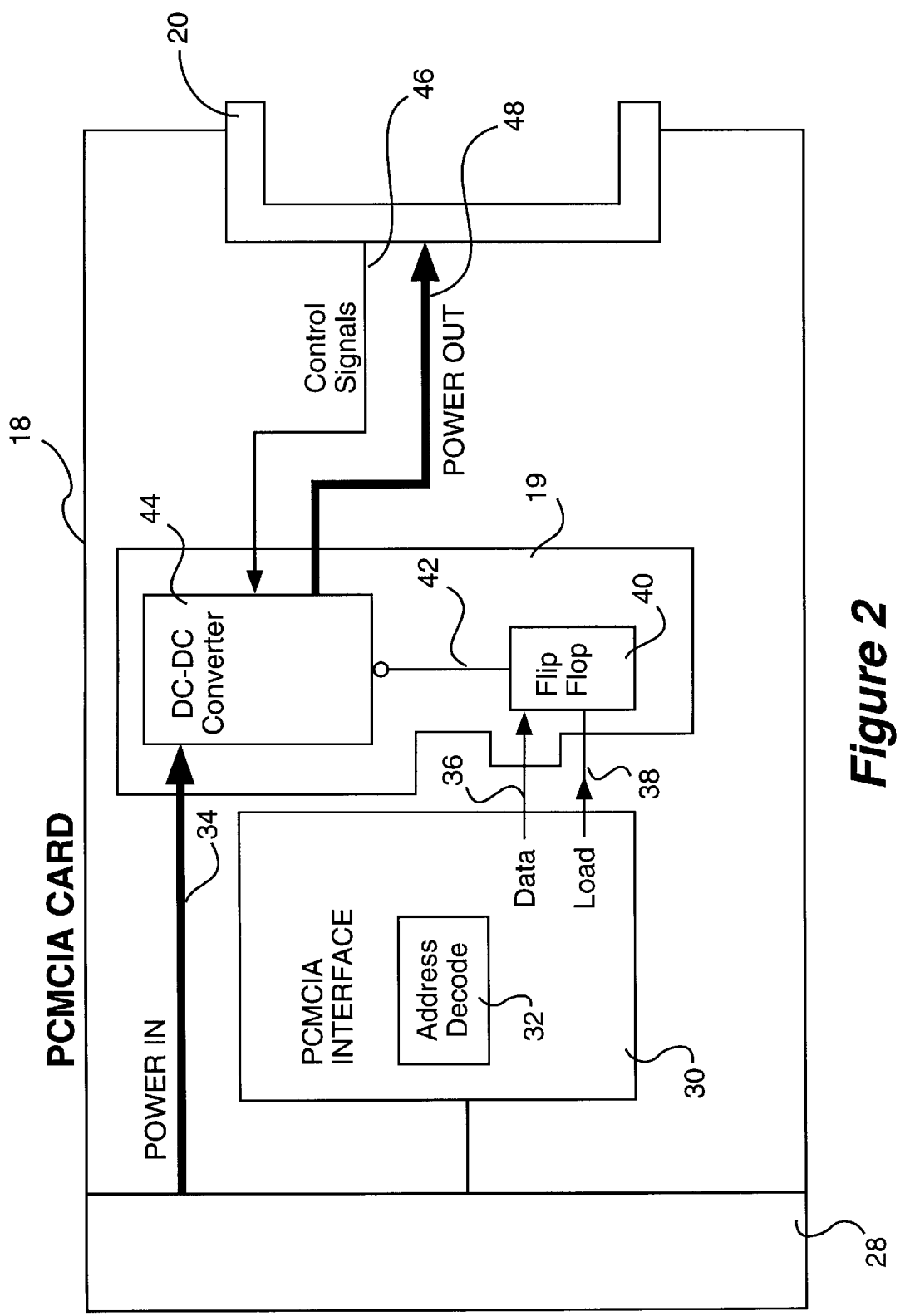
FIG. 2 illustrates one embodiment of the PCMCIA card of FIG. 1 in further detail.

FIG. 2 illustrates one embodiment of cellular phone battery charging circuitry 19 and PCMCIA card 18 in further detail. For the illustrated embodiment, cellular phone battery charging circuitry 19 includes DC—DC converter 44 and an addressable flip-flop 40 coupled to each other as shown. Additionally, DC—DC converter 44 is coupled to mobile-PC 10 by way of power input line 34 and standard conforming PCMCIA plug 28, and to adapter cable 23 by way of control signal lines 46, power output line 48 and receiver socket 20.

DC—DC converter 44 is a two stage DC—DC converter. The first stage is used to ramp up the PCMCIA voltage (5 v) to a higher voltage (e.g. 15 v). The second stage serves as a limited current adjustable power supply. Suitable DC—DC converters for the first stage include MAX 772 5–15 v 1A DC—DC converter manufactured by MAXIM Integrated Products of Sunnyvale, Calif., and suitable DC—DC converters for the second stage include LM205 manufactured by National Semiconductors of Santa Clara, Calif.

DC—DC converter 44 is turn on or off by flip-flop 40. While in an "On" state, DC—DC converter 44 receives DC power from power input line 34, and outputs converted DC power on power output line 48, in accordance to charging parameter information received over control signal lines 46. As described earlier, the charging parameter information includes the required charging voltage, charging current and charging slope of battery 13.

Flip-flop 40 is coupled to PCMCIA interface circuitry 30 by way of a data input line 36 and a load control line 38. As shown, PCMCIA interface circuitry 30 includes address decoding circuitry 32. Flip-flop 40 is mapped in PCMCIA configuration space. Flip-flop 40 is set and reset by mobile PC 10, by writing a "1" and a "0" bit to the particular PCMCIA configuration address.

While the cellular phone battery charging circuitry 19 has been described with an embodiment having its DC—DC converter 44 turn on/off by addressable flip-flop 40, it is readily apparent to those skilled in the art that DC—DC converter 44 may be turned on/off by a variety of other simple hardware and software approaches.

Figure 3A:
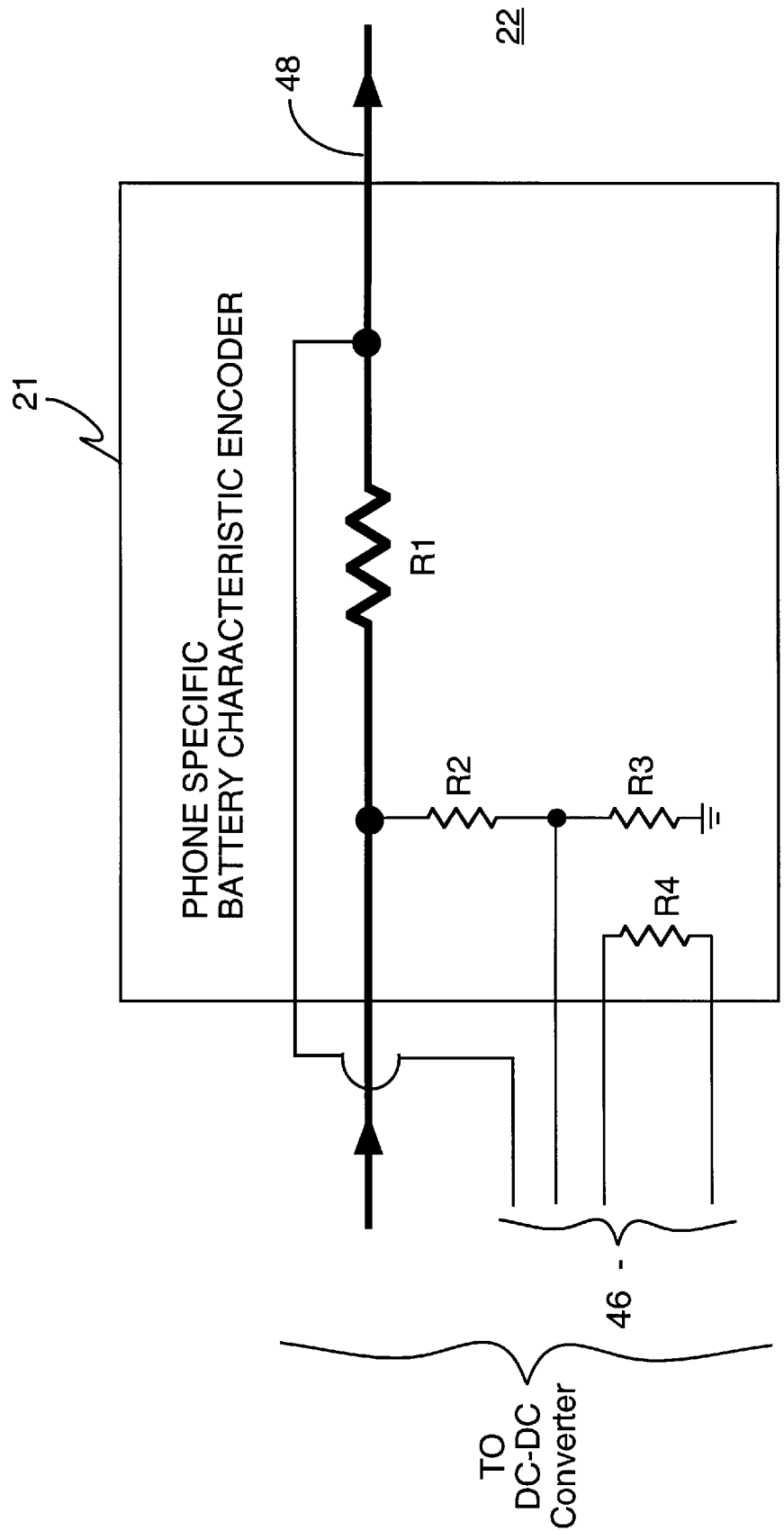

FIGS. 3a–3b illustrate two embodiments of battery characteristic encoder 21 in further detail. FIG. 3a illustrates an analog approach, whereas FIG. 3b illustrates a digital approach. For the analog embodiment, battery characteristic encoder 21 includes shunt resistor R1 for providing current feedback, resistors R2 and R3 for providing voltage feedback, and resistor R4 for selecting the charging slope. The values for resistors R1–R4 are cellular phone battery specific. By way of example, for a M715 battery used in NOKIA Cityman cellular phone (7.2 v 850 mAhr), the resistances of R1–R4 are 9.5K, 3.15K, 0.4, and 360 ohms respectively. For the digital embodiment, five control lines 46 are provided to select one of thirty-two predetermined charging voltage, current and slope combinations (2**5= 32). The particular strapping of control lines 46 is cellular phone battery specific.

Figure 4:
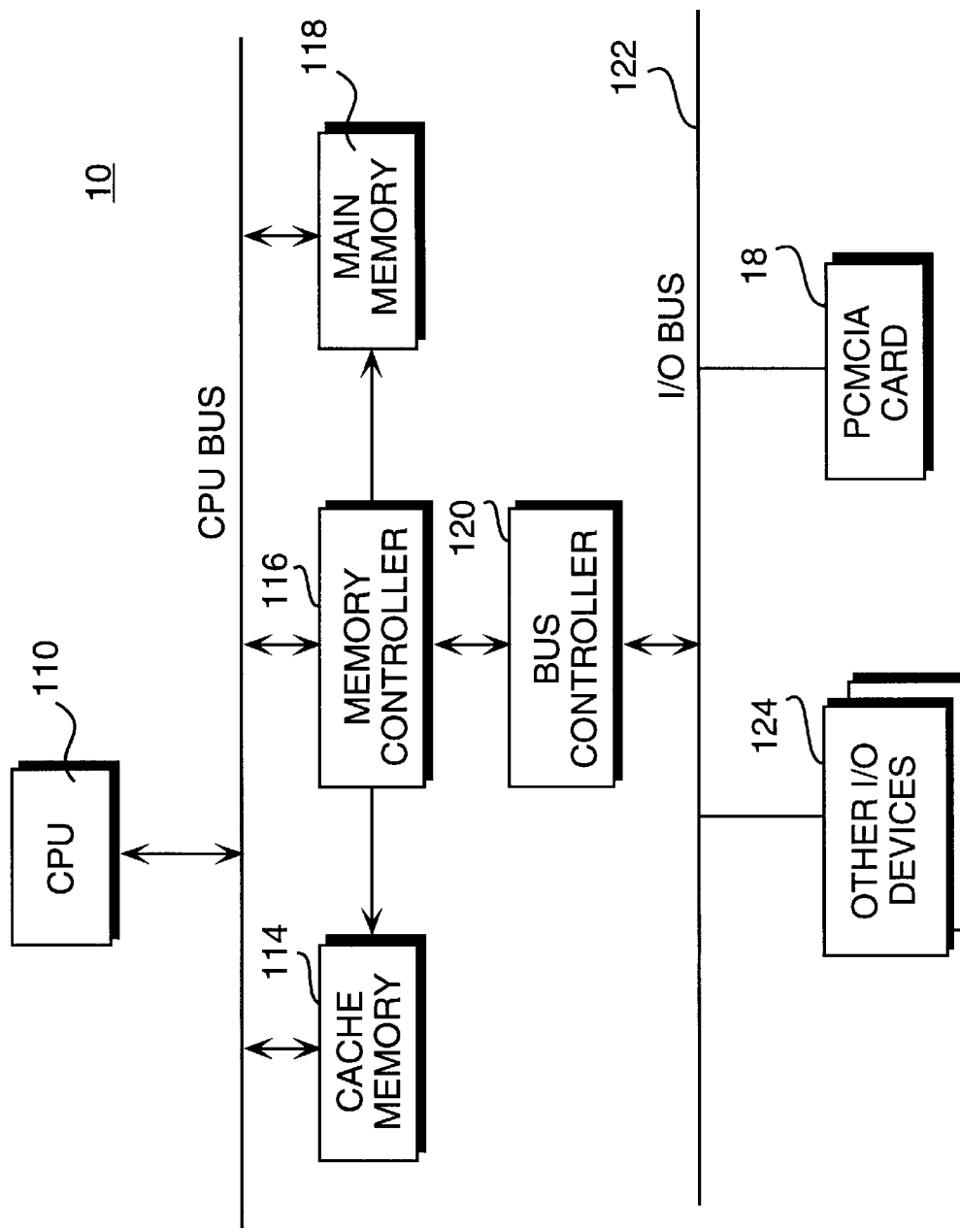
FIG. 4 illustrates an architectural view of one embodiment of the mobile PC of FIG. 1.
Figure 5:
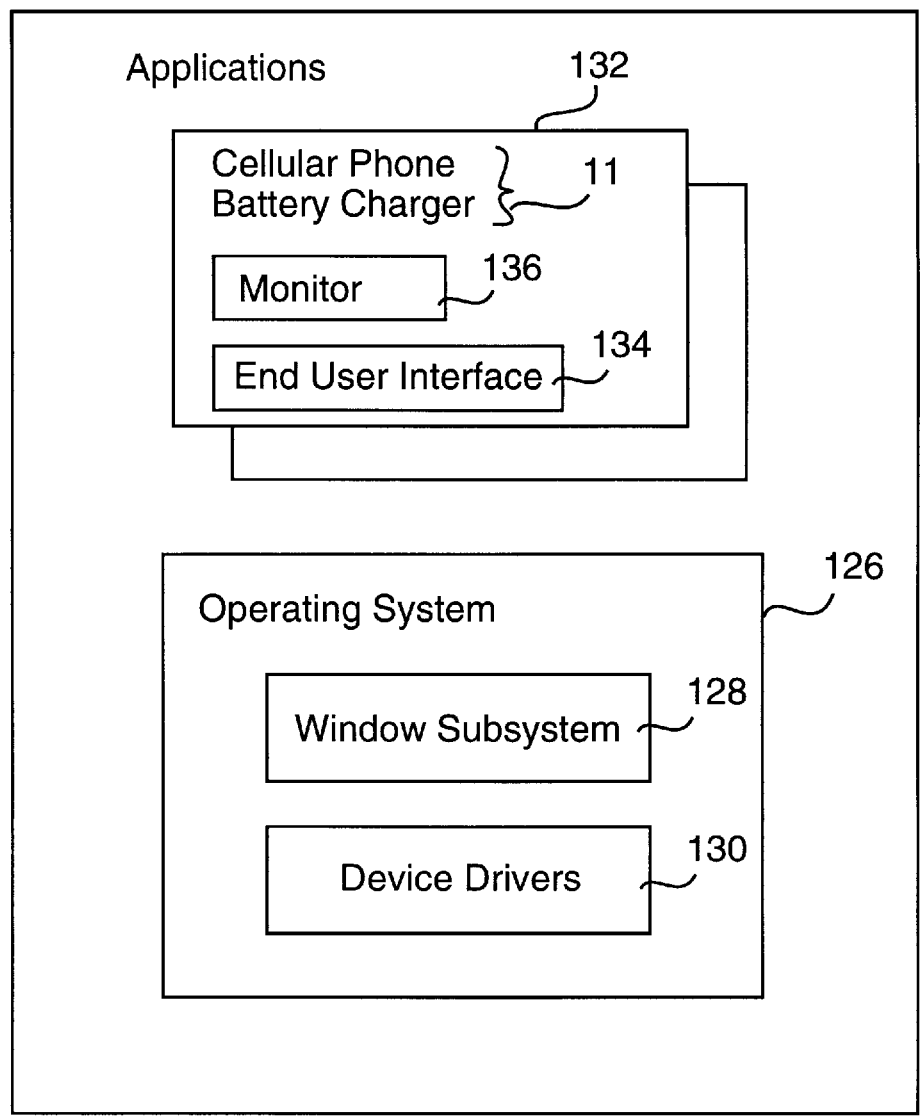
FIG. 5 illustrates a software view of one embodiment of the mobile PC of FIG. 1.
Figure 6A:
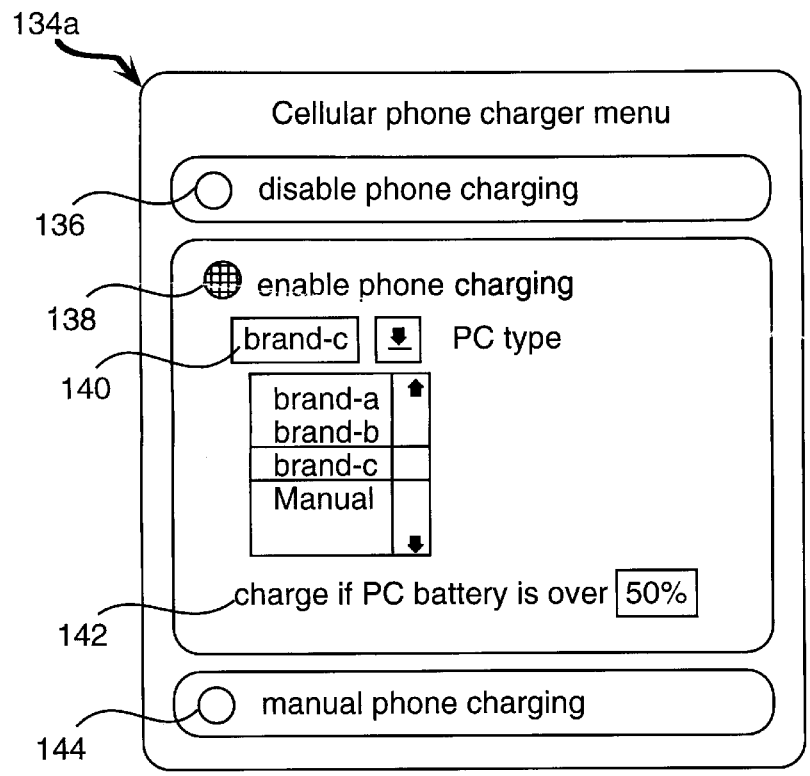
FIGS. 6a–6b illustrate two exemplary user interface windows of cellular phone battery charger application of FIG. 5.
Figure 6B:
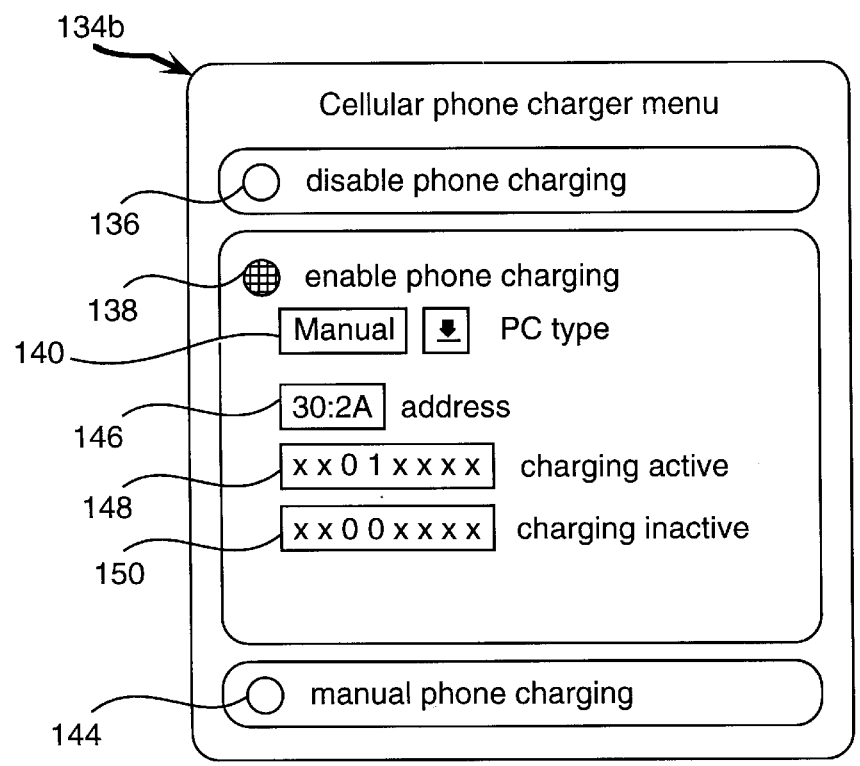

FIGS. 4–5 and 6a–6b illustrate one exemplary cellular phone battery charging software application 11. FIG. 4 illustrates the relevant hardware elements of mobile PC 10 executing exemplary cellular phone battery charging software application 11. FIG. 5 illustrates other software elements on mobile PC 10. FIG. 6a–6b illustrate two essential end user interface windows 134a–134b of exemplary cellular phone battery charging software application 11.

As illustrated in FIG. 4, mobile PC 10 includes CPU 110, cache memory 114, main memory 118, memory controller 116 and CPU bus 112 coupled to each other as shown. Mobile PC 10 further comprises bus controller 120, various I/O devices 124 and I/O bus 122 coupled to each other as shown. Memory controller 116 and bus controller 120 are also coupled to each other. PCMCIA card 18 incorporated with the teachings of the present invention is coupled to I/O bus 122. Additionally, bus controller 120 includes BIOS registers (not shown) for storing control and status information of battery 15 of mobile PC 10 and BIOS firmware for detecting the status of battery 15 and storing the control and status information into BIOS registers accordingly. Control and status information includes in particular the charge level of battery 15.

As illustrated in FIG. 5, in addition to exemplary cellular phone battery charging application 11, mobile PC 10 further preferably executes a window based operating system 126 including window subsystem 128 for providing various system services including "windowing" services for presenting windowed end-user interfaces to user of mobile PC 10. Exemplary cellular phone battery charging application 11 includes end user interface 134 and monitor routine 136. Monitor routine 136 monitors the above described BIOS registers for predefined conditions. Whenever the predefined conditions are satisfied, monitor routine 136 starts/stops operation of cellular phone battery charging circuit 19 accordingly. For the above described embodiment where addressable flip-flop 40 is employed, monitor routine 136 starts and stops operation of cellular phone battery charging circuit 19, by writing to the predetermined configuration address in the PCMCIA configuration space.

As illustrated in FIGS. 6a–6b, end user interface 134 includes first and second windows 134a–134b. From first window 134a, user of mobile PC 10 may select automatic charging of cellular phone battery 13, button 138, and a PC battery condition for governing the starting/stopping of cellular phone battery charging, input box 142. User of mobile PC 142 may further specify the locations of the above described BIOS registers and other related control information indirectly, by selecting one of a number supported mobile PC types (brand A, brand B etc.), selection box 140. These information by PC type may be provided to the cellular phone charging application 11 either statically or dynamically. From second window 134b, which is displayed upon selection of the "manual" way of providing the locations of the above described BIOS registers and other related control information in first window 134a, user of mobile PC 10 may specific the starting address of the BIOS registers, input box 146, as well as first and second bit patterns for denoting charging of cellular phone battery is active or inactive. As illustrated, in either window 134a or 134b, user of mobile PC 10 is also provided with the ability to disable cellular phone battery charging, button 136, and the ability to enable cellular phone battery charging unconditionally, button 144.

Thus, a method and apparatus for automatic cellular phone battery charging by mobile personal computer has been described. While the methods and apparatus of the present invention have been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A PCMCIA card comprising:
   a) a first connector for mating with a receiver socket of a computer, and for receiving first DC power at a first voltage level and configuration write data from the computer through the receiver socket;
   b) cellular phone battery charging circuitry, including a DC to DC converter and a storage element, coupled to the first connector for receiving the first DC power and the configuration write data, and in response, either disabling the DC—DC converter or enabling the DC—DC converter to convert the first DC power to second DC power at a second voltage level in accordance to battery charging parameter information received, and output the second DC power;
   c) a second connector coupled to the cellular phone battery charging circuitry for coupling the cellular phone battery charging circuitry to a battery characteristic encoder for receiving the battery charging parameter information from the battery characteristic encoders, and passing on the battery charging parameter information to the cellular phone battery charging circuitry, and for coupling the cellular phone battery charging circuitry to a cellular phone battery to charge the cellular phone battery with the second DC power.

2. The PCMCIA card as set forth in claim 1, wherein the storage element is a flip-flop outputting an enabling/disabling signal for enabling/disabling the DC—DC converter responsive to the configuration write data.

3. A mobile personal computer (PC) comprising:
   a receiver socket for mating with a PCMCIA card having cellular phone battery charging circuitry that includes a DC—DC converter and a storage element, and for supplying first DC power at a first voltage level and configuration write data to the cellular phone battery charging circuitry, wherein the storage element responsive to the configuration write data enables/disables the DC—DC converter, and when enabled, the DC—DC converter converts the first DC power to a second DC power at a second voltage level in accordance to charging parameter information received, and outputs the second DC power; and
   control means coupled to the receiver socket for generating the configuration address for the cellular phone battery charging circuitry.

4. The mobile PC as set forth in claim 3, the control means comprises writing means coupled to the receiver socket for selectively writing a "1" bit or a "0" bit to a predetermined configuration address of a PCMCIA configuration address space, the storage element being a flip flop mapped to the predetermined configuration address.

5. The mobile PC as set forth in claim 3, wherein
   the mobile PC further comprises a battery for supplying DC power to the mobile PC; and
   the control means comprises
      one or more BIOS registers for storing control and status information of a battery of the mobile PC, and
      monitor means coupled to the BIOS register(s) for monitoring the stored control and status information and detecting for a predetermined condition.

6. The mobile PC as set forth in claim 5, wherein the control means automatically generates the control signals whenever monitor means detects the predetermined condition.

7. The mobile PC as set forth in claim 6, wherein the mobile PC further comprises a power adapter coupled to an AC power source and the battery for transforming AC power into DC power for charging the battery.

8. The mobile PC as set forth in claim 3, wherein the control means further comprises an end user interface for accepting user preferences and/or commands related to the generation of the configuration write data for the cellular phone battery charging circuitry.

9. A computer comprising:
   a receiver socket for mating with a PCMCIA card having cellular phone battery charging circuitry that includes a DC—DC converter and a storage element, and for supplying first DC power at a first voltage level and configuration write data to the cellular phone battery charging circuitry, where in the storage element responsive to the configuration write data enables/disables the DC—DC converter, and when enabled, the DC—DC converter converts the first DC power to second DC power at a second voltage level in accordance to charging parameter information received, and outputs the second DC power;
   control means coupled to the receiver socket for generating the configuration write data for the cellular phone battery charging circuitry.

10. The computer as set forth in claim 9, the control means comprises writing means coupled to the receiver socket for selectively writing a "1" bit or a "0" bit to a predetermined configuration address of a PCMCIA configuration address space, the storage element being a flip-flop mapped to the predetermined configuration address.

11. A mobile computing system comprising:
   a) a mobile personal computer (PC) including a first battery for outputting first DC power at a first voltage level;
   b) a PCMCIA card, including a cellular phone battery charging circuitry that includes a DC—DC converter and a storage element, coupled to the mobile PC for converting the first DC power into second DC power at a second voltage level in accordance to battery charging parameter information provided, and outputting the second DC power, responsive to configuration write data written into the storage element by the mobile PC; and
   c) a cellular phone adapter cable for providing the battery charging parameter information to the cellular phone battery charging circuitry of PCMCIA card, and for coupling the second DC power to a second battery of a cellular phone for charging the second battery.

12. The mobile computing system as set forth in claim 11 wherein the mobile computing system further comprises the cellular phone including the second battery.

13. The mobile computing system as set forth in claim 11 wherein the mobile PC comprises a.1) a receiver socket for mating with the PCMCIA card, and supplying the first DC power to the cellular phone battery charging circuitry of PCMCIA card.

14. The mobile computing system as set forth in claim 13, wherein the mobile PC further comprises a.2) control means coupled to the receiver socket for generating the configuration write data.

15. In a mobile computing system comprising a cellular phone having a first battery, a method for charging the first battery of cellular phone comprising the steps of:
   a) outputting first DC power at a first voltage level and configuration write data by a mobile PC;
   b) coupling the first DC power and the configuration write data to cellular phone battery charging circuitry disposed in a PCMCIA card coupled to the mobile PC, wherein the cellular phone battery charging circuitry includes a DC—DC converter and a storage element that enables/disables the DC—DC converter responsive to the configuration write data, and providing the cellular phone battery charging circuitry with battery charging parameter information of the first battery of cellular phone using a battery characteristic encoder disposed in a cellular phone adapter cable coupled to the PCMCIA card;
   b) enabling the DC—DC converter, then converting the first DC power to second DC power at a second voltage level, and outputting the second DC power in accordance with the battery charging parameter information provided; and
   c) coupling the second DC power by the cellular phone adapter cable to the first battery of cellular phone and charging the first battery.

16. The method as set forth in claim 15, wherein step a) is automatically performed by the mobile PC upon detecting a predetermined condition.

17. The method as set forth in claim 16, wherein step a) further comprises continuous monitoring and storing of charge and control status of a second battery of mobile PC in predetermined locations of mobile PC by mobile PC, and continuously monitoring for whether the predetermined condition has been met by mobile PC.

18. The method as set forth in claim 16, wherein step a) further comprises accepting control inputs, including decisional factors of the predetermined condition, through an user interface by mobile PC.

* * * * *